Nov. 21, 1961 A. J. NUGENT 3,009,645
SELF-PROPELLED IRRIGATION SPRINKLER
Filed Feb. 14, 1961 3 Sheets-Sheet 3
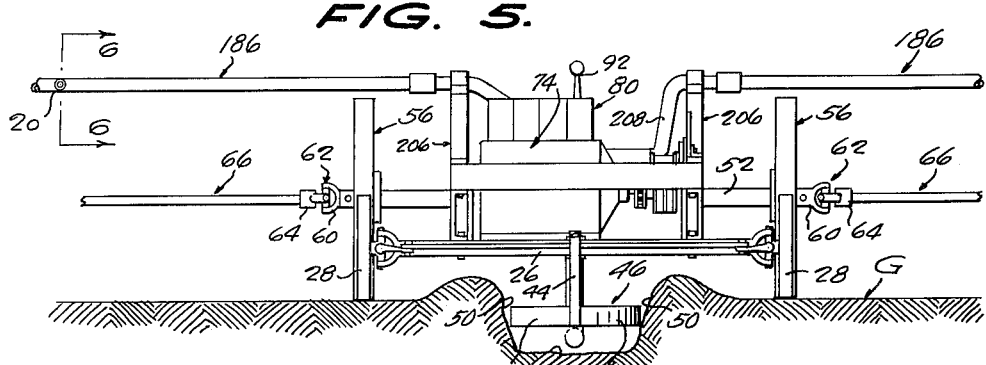
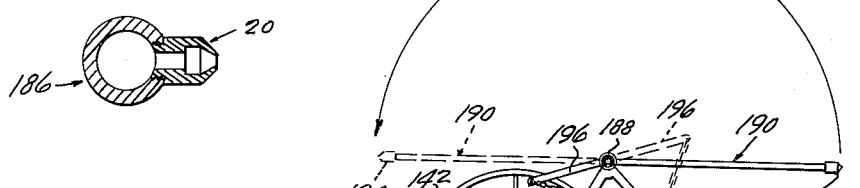
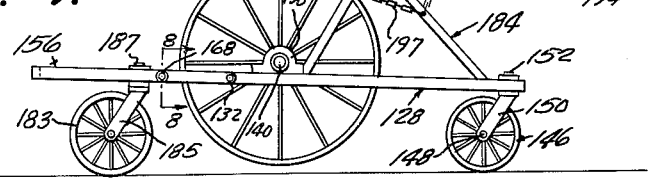
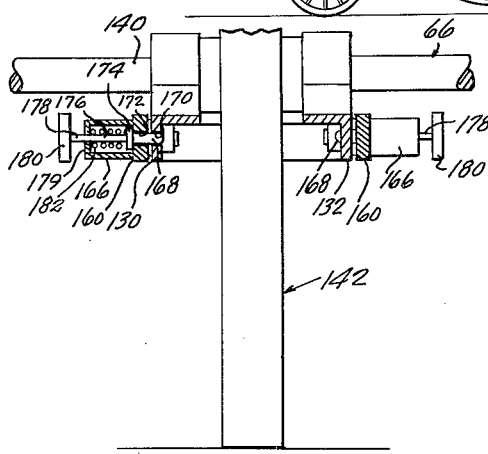
INVENTOR.
ARCHIE J. NUGENT,
BY
McMorrow, Berman + Davidson
ATTORNEYS.

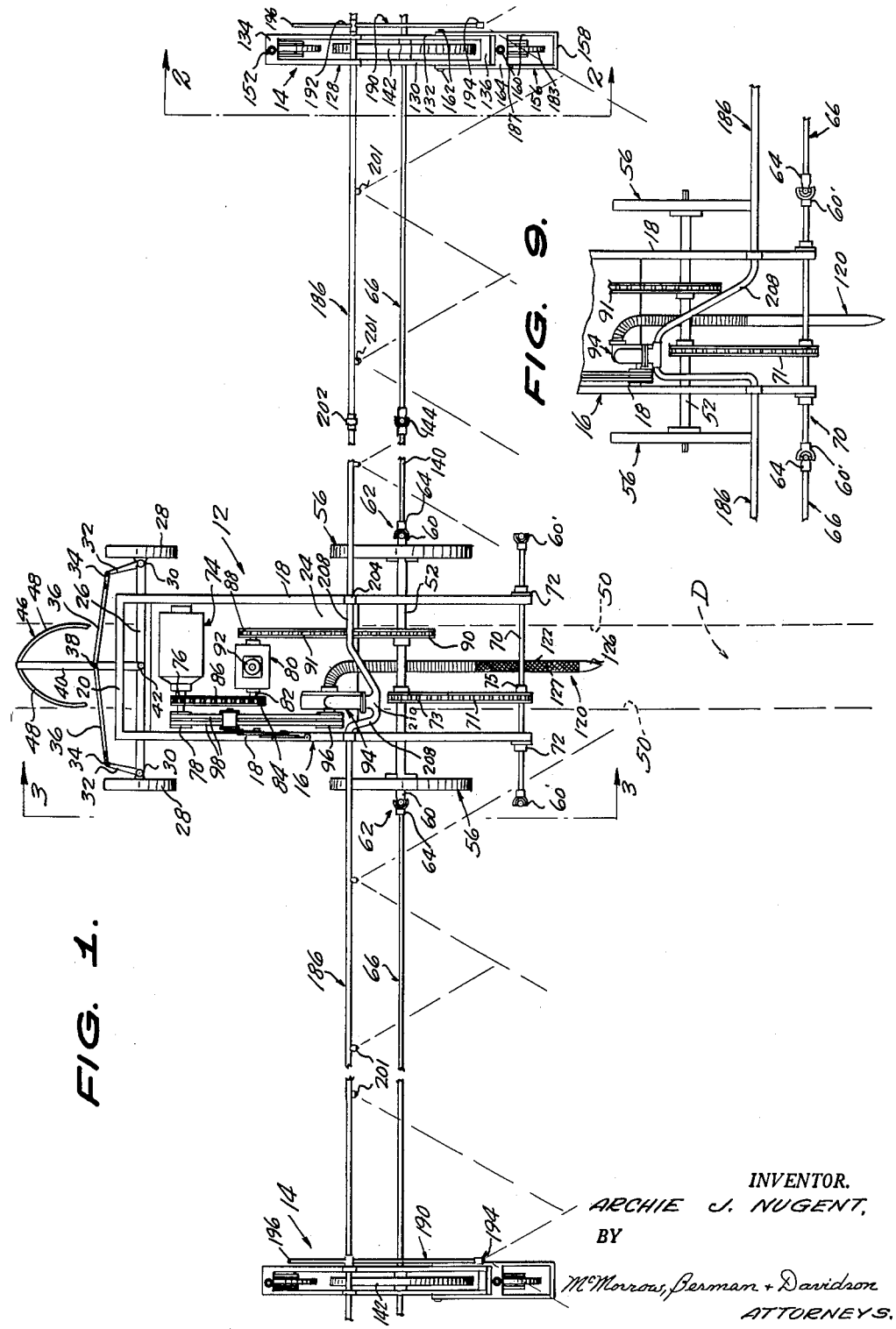

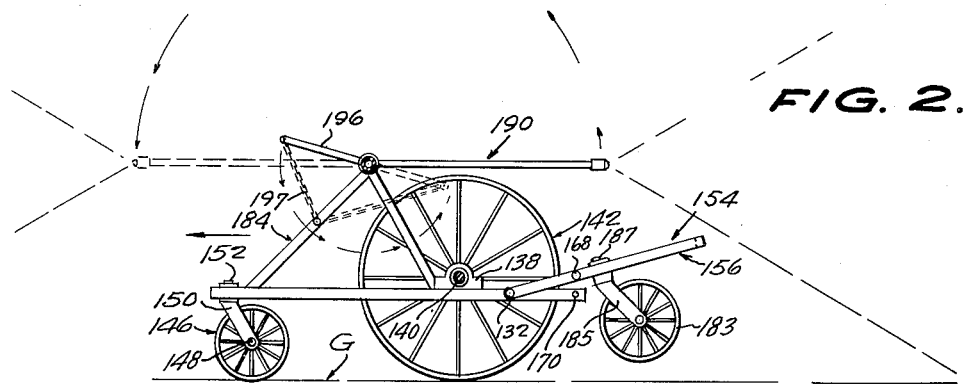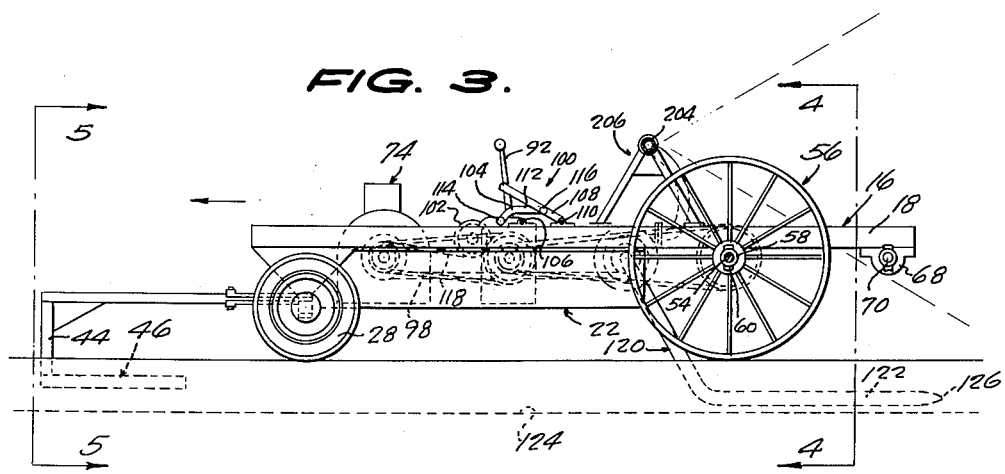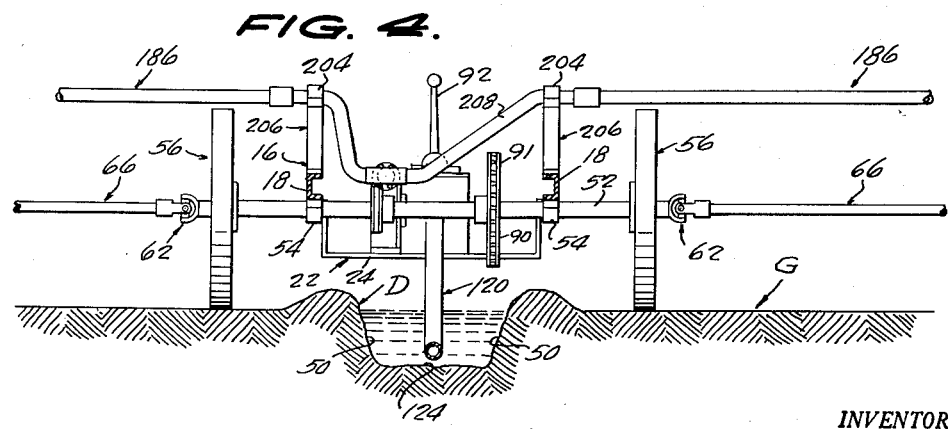

United States Patent Office 3,009,645
Patented Nov. 21, 1961

3,009,645
SELF-PROPELLED IRRIGATION SPRINKLER
Archie J. Nugent, Box 757, Forsyth, Mont.
Filed Feb. 14, 1961, Ser. No. 89,211
3 Claims. (Cl. 239—179)

This invention relates to a novel self-propelled field sprinkler for spraying water from an irrigation ditch onto a field at opposite sides of the ditch.

The primary object of the invention is the provision of a more practical, economical, and efficient sprinkler of the kind indicated, which is self-steering, and which, while in operation, requires minimal or no attention, and which can be reversed in direction along a ditch, and can be driven to different locations, by one man.

Another object of the invention is the provision of a sprinkler of the character indicated above, which comprises a main or central self-propelling carriage carrying a water pump and drive motor which serves to drive both the pump and the wheels of the carriage, and outrigger carriages, spaced from opposite sides of the main carriage, the wheels of the outrigger carriages being driven by shafts extended thereto from the main carriage, and sprinkler nozzle-equipped conduits extending from the main carriage to the outrigger carriages.

A further object of the invention is the provision of a sprinkler of the character indicated above wherein its outrigger carriages have forward and rear caster wheels, located in front of and behind their drive wheels, the caster wheels being smaller in diameter than the drive wheels and having thick axes spaced below the axes of the drive wheels, and means for depressing the rear caster wheels, relative to the drive wheels, whereby the drive wheels are elevated above the ground and the outrigger carriages are supported on their front and rear caster wheels, whereby when the outrigger carriages are disconnected from the main carriage, the outrigger carriages can be easily towed to new locations on a field.

A still further object of the invention is the provision of a sprinkler of the character indicated above, wherein its main carriage has relatively stationary drive wheels, and a pair of storable wheels, at its forward end, and a forwardly extending ditch wall engaging pilot which is operatively connected to the storable wheels, whereby the main carriage is kept in alignment with a water ditch, without attention from the operator of the sprinkler.

Other important objects and advantageous features of the invention will be apparent from the following description and the accompanying drawings, wherein, for purposes of illustration only, a specific form of the invention is set forth in detail.

In the drawings:

FIGURE 1 is a top plan view of a sprinkler in accordance with the present invention, shown in line with a water ditch in a field;

FIGURE 2 is a vertical longitudinal section taken on the line 2—2 of FIGURE 1, showing the caster wheels and the spray pipe in normal positions, in full lines, and the spray pipe reversed, in phantom lines for rearward or reverse travel of the sprinkler;

FIGURE 3 is a left-hand side elevation of the main carriage, showing the pilot and the water intake pipe positioned in a watch ditch;

FIGURES 4 and 5 are enlarged vertical transverse sections taken on the lines 4—4 and 5—5 of FIGURE 3;

FIGURE 6 is an enlarged vertical longitudinal section taken through a sprinkler conduit and a nozzle;

FIGURE 7 is a view of the opposite side of FIGURE 2, showing the rear caster wheel depressed to the ground and elevating the drive wheel above the ground, and the spray pipe in normal position in full lines, and in reversed position in phantom lines;

FIGURE 8 is an enlarged fragmentary vertical transverse section taken on the line 8—8 of FIGURE 7; and, FIGURE 9 is a fragmentary top plan view of the rear of the main carriage, showing the outrigger drive wheel drive shaft connected to an auxiliary shaft positioned on the main carriage behind the main carriage drive wheels to which the drive shafts are normally connected.

Referring in detail to the drawings, wherein like numerals designate like parts throughout the several views, the illustrated sprinkler comprises a main carriage 12, and two similar outrigger carriages 14. The main carriage 12 comprises an open horizontal frame 16 having parallel spaced side members 18 and a front cross member 20 extending between and fixed to the forward ends of the side members. A pan-shaped well 22 is suspended on and between the side members 18, along the forward half of the frame 16, and has a bottom wall 24. A fixed front axle 26 is fixed to the underside of the well 22, at the forward end thereof, and has relatively small diameter steerable wheels 28 vertically pivoted on its ends, as indicated at 30, and having steering arms 32 extending forwardly therefrom. The steering arms 32 are pivoted at their forward ends, at 34, to the laterally outward ends of drag links 36 which have a common pivotal connection 38 with an intermediate part of a longitudinal steering bar 40, which extends forwardly from the axle 26.

The steering bar 40 is pivoted, at its rear end, to the center of the front axle 26, as indicated at 42, and has a braced, downwardly extending standard 44, on its forward end, which reaches below the level of the bottom of the steerable wheels 28, and has a pilot 46 fixed to its lower end. As shown in FIGURES 1 and 5, the pilot 46 comprises a pair of horizontal, rearwardly divergent, and longitudinally and outwardly curved flat bars 48 which are suitably fixed, at their forward ends, to the standard 44. The spread of the rear ends of the pilot bars 48 is only slightly less than the distance between the walls or sides 50 of a water ditch D, over which, and along which, the main carriage 12 is to be driven. The pilot bars 48 make sliding contact with the ditch walls 50 as the sprinkler is moved forwardly along the ditch D, whereby any deviation of the main carriage to each side of the ditch is corrected by the steering of the steerable wheels 28, engaged with the ground G, at opposite sides of the ditch, by corrective pivoting of the steering bar 40.

A rotary drive wheel axle 52 is journalled in bearings 54, secured to the underside of the frame side members 18, at locations between the well 22 and the rear end of the frame 16, and has relatively large diameter drive wheels 56 fixed on its outer ends, and spaced outwardly from the side members. The hubs 58 of the drive wheels 56 have, on their outer ends, inner sections 60 of quick-connect universal couplings 62, which have separable outer sections 64, on the inner ends of drive shafts 66, for the outrigger carriages 14.

The frame side members 18 have additional bearings 68 secured to the undersides thereof, at their rear ends, in which is adapted to be journalled an auxiliary driving shaft 70, restrained against endwise movement by thrust bearings 72, fixed to the side members 18. Fixed on the outer ends of the driving shaft 70 are sections 60' of quick-connect universal couplings, to which the outer sections 64 of the couplings 62 are adapted to be connected, when disassociated from the drive wheel coupling sections 60, in an arrangement wherein a trailing relationship of the outrigger carriages 14, relative to the main carriage 12, is desired.

Mounted on the bottom wall 24 at the front end of the well 22 is a motor 74 having a transverse shaft projecting at one end, on which are fixed a sprocket wheel 76 and a double belt pulley 78. A change-speed gear box 80 is mounted on the bottom wall 24 behind the motor 74, which has a shaft 82 having on one end, a sprocket wheel 84, aligned with the sprocket wheel 76, a sprocket chain 86 being trained over the sprocket wheels 76 and 84. On the other end of the gear box shaft 82 is another sprocket wheel 88 which is aligned with a sprocket wheel 90 fixed on the drive wheel axle 52, and a sprocket chain 91 is trained thereover. A gear shaft lever 92, for changing gears (not shown) in the gear box 80, rises from the gear box, and is manipulatable for selecting the speed at which the sprinkler is operated along the ditch D.

Mounted on the well bottom wall 24, behind the gear box 80, is a pump 94 having a double belt pulley 96 on its shaft, which is aligned with the motor shaft double belt pulley 78 and is connected thereto by parallel belts 98. Mounted on the adjacent frame side member 18 is a clutch roller assembly 100 which comprises an idler roller 102 journalled on the forward end of a V-shaped arm 104 which is pivoted, at its rear end, as indicated at 106, upon the top of the frame side member, an upstanding positioning lever 108, pivoted, as indicated at 110, on the side member behind the pivot 106, and a link 112. The link 112 is pivoted, at its forward end to an intermediate part of the arm 104, as indicated at 114, and is pivoted, at its rear end, as indicated at 116, to an intermediate part of the lever 108. This arrangement provides an over-center toggle device which, with the lever 108 in a forward position, as shown in FIGURE 3, the roller 102 is engaged with and depresses the upper flights 118 of the belts 98, so as to tighten the belts on the pulleys 78 and 96, and operatively connect the motor 74 to the pump 94. Swinging the lever rearwardly withdraws the roller 102 from the belt flights 118 and disconnects the motor from the pump. Extending rearwardly and downwardly from the pump 94 is a flexible intake conduit 120 having a rear portion 122 which is adapted to lie slidably upon the bottom surface 124 of the ditch D, as shown in FIGURE 3. The rear conduit portion 122 has a closed rear end 126, but has a perforated sidewall 127, for intake of water from the ditch D.

The auxiliary driving shaft is operatively connected to the driving axle 52 by a sprocket chain 71 trained over similar diameter sprocket wheels 73 and 75, fixed on the axle 52 and the shaft 70, respectively, whereby the shaft 70 turns at the same speed as the axle 52, so that, when the drive shafts 66 are connected to the auxiliary driving shaft 70, the drive wheels of the outrigger carriages 14 are driven at the same speed as the drive wheels 56 of the main carriage.

Each of the outrigger carriages 14 comprises a narrow, open rectangular horizontal frame 128 having inner and outer side members 130 and 132, respectively, and front and rear cross members 134 and 136, respectively. Bearings 138 fixed upon the tops of the side members 130, 132, at locations nearer to the rear end of the frame 128 than the forward end thereof, have journalled therethrough a drive wheel shaft 140, on which is fixed, between the side members 130, 132 a relatively large diameter drive wheel 142, which is the same in diameter as the drive wheels 56 of the main carriage 12. The drive shaft 140 is rigid with the outer end of the related drive shaft 66, of the desired relatively long length, and the shaft 66 has incorporated therein a universal joint 144, and terminates, at its inward end in an outer quick-connect coupling section 64, which is connected to the inner section 60 of the coupling 62. As a result, the main carriage drive wheels 56, and the outrigger drive wheels 142 being the same in diameter and being driven at the same speed, the rotation of the outrigger drive wheels, in contact with the ground G, causes the outrigger carriages 14 to keep pace with and stay in alignment with the main carriage 12.

The outrigger carriage frame 128 is supported, at its forward end, on a front caster wheel 146, which is smaller in diameter than the drive wheel 142 and has its axle 148 journalled in a fork 150, on a level spaced below the frame 124 and below the axis of the drive wheel 142, the fork being journalled, at its upper end, as indicated at 152, in the front frame cross member 134. As shown in FIGURE 2, the outrigger carriages are normally supported on the front caster wheels 146 and the drive wheels 142, but, in order that the outrigger carriages can be towed freely over the ground G, with their drive wheels 142 out of contact with the ground, a vertically adjustable rear caster wheel assembly 154 is provided on the frames 128, behind the drive wheels.

Each adjustable rear caster wheel assembly 154 comprises a reclining U-shaped yoke 156 having a bight portion 158, at its rear end, and forwardly extending legs 160 which extend along the outer sides of the frame side members 130 and 132, and are pivoted thereto, at their forward ends, as indicated at 162. The yoke 156 extends rearwardly beyond the frame 128 and has a cross member 164, located intermediate its ends and positioned behind the rear frame cross member 136, as shown in FIGURE 1.

As shown in FIGURE 8, the yoke legs 160 are provided, between the cross member 164 and the forward ends of the legs, with housings 166, fixed to their outer sides, in which inwardly spray pressed locking pins 168 are mounted, for locking engagement in holes 170, provided in the frame side members 130 and 132. The pins 168 work through holes 172, provided in the yoke legs 160, and have stop collars 174 which engage the outer sides of the legs. The pins 168 further comprise shafts 176 which work through holes 178 in the closed outer ends 179 of the housings 166 and have enlarged external manual operating heads 180, on their outer ends. Coil springs 182 are circumposed on the shafts 176 and are compressed between the housing ends 179 and the collars 174 and urge the pins 168 inwardly. The yoke 156, unlocked by the pins 168, is free to move upwardly from the plane of the frame 128, as shown in FIGURE 2, while the outrigger carriages 14 are connected to the main carriage 12 and operated over the ground G. However, when the outrigger carriages are to be disconnected from the main carriage and towed away to a new location of a field, the rear caster wheel 183 on a fork 185 which is journalled at its upper end, on the cross member 164, as indicated at 187, is depressed into contact with the ground G, and relative to the frame 28, by swinging the yoke 156 downwardly to a coplanar relationship with the frame 128, and the pins 168 are engaged in the frame side member holes 170, so as to lock the rear caster wheel down and elevate the drive wheel 142 out of contact with the ground. The outrigger carriages 14 are then supported entirely by the front and rear caster wheels, and can be towed freely over the ground, with the drive shafts 66 trailing the outrigger carriages.

Upstanding inverted V-shaped supports 184 are fixed on the frame side members 130 and 132, between the bearings 138 and the forward end of the frame 128 and the outer end portion of a spray conduit 186 extends through a tube 188 fixed at the apices of the supports 184. A horizontal longitudinal spray pipe 190 is journalled on and in communication with the conduit 186, as indicated at 192, at the laterally outward side of the frame 128, and has a free end provided with a spray nozzle 194. A radial handle lever 196 is fixed to the journal 192 and is adapted to be used for reversing the spray pipe 190 from a normally rearwardly extending horizontal position, shown in full lines in FIGURES 2 and 7, to a forwardly extending position, shown in phantom lines. The outboard positioning of the spray pipe 190 is provided, so that the ground track of the drive wheel will not be wet by the spray issuing from the spray pipe. A chain 197 is secured at one end to the lever 196 and is adapted to be removably secured, at its other end, to a support 184, for holding the spray pipe 190 in either position.

The spray conduits 186 extend between the main carriage 12 and the outrigger carriages 74, and are positioned forwardly of and parallel to the drive shafts 66 and spaced parallel thereabove. The conduits 186 are rigid, and have spaced rearwardly directed nozzles 201 thereon, and have universal joints 202 incorporated thereon, and alignment with the drive shaft universal joints 144. At their inner ends, the conduits 186 are supported, as indicated at 204, on the apices of upstanding inverted V-shaped supports 206 on the side members 18 of the main carriage frame 16, and have extensions 208 which are connected to a manifold 210 connected to a discharge neck of the pump 94.

It is to be observed that, because the spray pipes 190 are located outside of the outrigger carriages 14, and the nozzles 201 of the spray conduits 186 are spaced from and located between the main carriage 12 and the outrigger carriages 14, and the spraying is in a rearward direction, thorough wetting of the ground is produced, without wetting the ground tracks of the various drive wheels, so that the drive wheels have effective grip on the ground for moving the sprinkler over the ground along a ditch D.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A self-propelled irrigation sprinkler comprising a main carriage and outrigger carriage disposed at and spaced from opposite sides of said main carriage, said main carriage having a pair of transversely aligned ground-engaging drive wheels and said outrigger carriages having single ground-engaging drive wheels, drive shafts extending between the outrigger carriage drive wheels and related drive wheels of the main carriage, and connected thereto, the drive wheels of the outrigger carriages being the same in diameter as the drive wheels of the main carriage, each of said outrigger carriages including a front ground-engaging caster wheel forwardly of the single ground-engaging drive wheel in contact with the ground and a rear ground-engaging caster wheel rearwardly of the single ground-engaging drive wheel and elevated out of contact with the ground, and means operatively connecting said rear ground-engaging caster wheel to said single ground-engaging drive wheel for movement of said rear caster wheel from the position elevated out of contact with the ground to a position below the single drive wheel to thereby support the outrigger carriage on the forward and rear caster wheels with the single drive wheel elevated out of contact with the ground, motor means on the main carriage operatively connected to the main carriage drive wheels, a pump on said main carriage operatively connected to said motor means, said pump having a flexible water intake conduit having an intake portion to slide along the bottom of a water ditch straddled by the main frame drive wheels, said pump having a discharge, and spring nozzle equipped conduits extending between the outrigger carriages and the main carriage, said nozzle conduits having inner ends supported on the main carriage and connected to the pump discharge.

2. A self-propelled irrigation sprinkler comprising a main carriage and outrigger carriage disposed at and spaced from opposite sides of said main carriage, said main carriage having a pair of transversely aligned ground-engaging drive wheels and said outrigger carriages having single ground-engaging drive wheels, drive shafts extending between the outrigger carriage drive wheels and related drive wheels of the main carriage, and connected thereto, the drive wheels of the outrigger carriages being the same in diameter as the drive wheels of the main carriage, motor means on the main carriage operatively connected to the main carriage drive wheels, a pump on said main carriage operatively connected to said motor means, said pump having a flexible water intake conduit having an intake portion to slide along the bottom of a water ditch straddled by the main frame drive wheels, said pump having a discharge, and spring nozzle equipped conduits extending between the outrigger carriages and the main carriage, said nozzle conduits having inner ends supported on the main carriage and connected to the pump discharge, said outrigger carriages having horizontal open frames having front and rear ends and spaced side members, the outrigger carriage drive wheels being positioned between said side members, a front ground-engaging caster wheel journalled on and depending from the front at its front end and spaced forwardly from their drive wheels, and rear ground-engaging caster wheel assemblies on said frames behind their drive wheels, said assemblies comprising U-shaped yokes having bight portions on their rear ends and forwardly extending legs extending along the outer sides of the frame side members, said legs being pivoted at their forward ends to said side members, pendant forks pivoted at their upper ends to an intermediate part of the yokes, and rear caster wheels journalled on the lower ends of the forks, and means for releasably locking the yokes to the frame in depressed positions wherein the rear caster wheels are below the drive wheels and the outrigger carriages are supported on the forward and rear caster wheels with their drive wheels elevated out of contact with the ground.

3. A self-propelled irrigation sprinkler comprising a main carriage and outrigger carriage disposed at and spaced from opposite sides of said main carriage, said main carriage having a pair of transversely aligned ground-engaging drive wheels and said outrigger carriages having single ground-engaging drive wheels, drive shafts extending between the outrigger carriage drive wheels and related drive wheels of the main carriage, and connected thereto, the drive wheels of the outrigger carriages being the same in diameter as the drive wheels of the main carriage, motor means on the main carriage operatively connected to the main carriage drive wheels, a pump on said main carriage operatively connected to said motor means, said pump having a flexible water intake conduit having an intake portion to slide along the bottom of a water ditch straddled by the main frame drive wheels, said pump having a discharge, and spring nozzle equipped conduits extending between the outrigger carriages and the main carriage, said nozzle conduits having inner ends supported on the main carriage and connected to the pump discharge, a pair of transversely spaced and aligned steerable ground-engaging wheels pivotally mounted on the main carriage forwardly of its drive wheels, a longitudinal steering bar pivoted at its rear end on the main carriage, a pilot mounted on and positioned below said steering bar, on a level to engage between the sidewalls of a water ditch straddled by the main carriage drive wheels, and means operatively connecting the steering bar to the steerable wheels, said pilot comprising a pair of rearwardly diverging flat arms fixed at their forward ends to said standard, the pilot arms being longitudinally and laterally outwardly curved between their ends.

References Cited in the file of this patent

UNITED STATES PATENTS

| | | |
|---|---|---|
| 495,792 | Fairman | Apr. 18, 1893 |
| 2,718,433 | Poyner et al. | Sept. 20, 1955 |
| 2,744,785 | Lindengreen | May 8, 1956 |
| 2,892,466 | Stilwell | June 30, 1959 |